Patented May 11, 1937

2,080,188

UNITED STATES PATENT OFFICE 2,080,188

AMINO-ARYLSULPHONE-SULPHONIC ACIDS AND PROCESS OF MAKING SAME

Jakob Scheidegger, Basel, Switzerland, assignor to Society of Chemical Industry in Basle, Basel, Switzerland No Drawing. Application February 26, 1936, Serial No. 65,917. In Switzerland July 8, 1935

7 Claims. (Cl. 260—129)

This invention relates to the manufacture of valuable amino-aryl-sulphone-sulphonic acids of the general formula

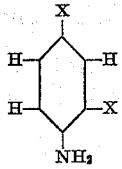

in which one X stands for a sulphone group, i. e. a $SO_2R$ group wherein R is a member of the group consisting of alkyl, aralkyl, cycloalkyl and aryl, and in which the other X stands for a $SO_3H$ group, by converting into an acid sulphate an amino-aryl-sulphone of the general formula

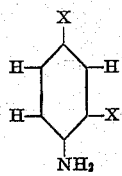

in which one X stands for a hydrogen atom and the other X stands for the grouping $SO_2R$ wherein R has the meaning indicated above, and then heating the acid sulphate to a high temperature, preferably under diminished pressure.

As parent materials may be named, in particular amino-aryl-sulphones which contain the amino-group in ortho-position to the sulphone-group. The sulphone-group may be twice directly combined with an aromatic carbon atom but may also be linked once with an alkyl or an aralkyl residue which may be substituted. Thus, there come particularly into question products like ortho-amino-diphenyl-sulphone and its substitution products, for instance 2-amino-1,1'-diphenyl - sulphone, 2-amino-4'-methyl-1,1'-diphenylsulphone, 2 - amino - 3'- chloro - 1,1' - diphenyl-sulphone, that is to say ortho-aminosulphones which contain no substituent in para-position to the amino-group. Furthermore, there are suitable aromatic aliphatic amino-sulphones, for instance 1-amino-benzene-2-methyl-sulphone, 1-amino-benzene-2-ethyl-sulphone, 1-amino-benzene-2-propyl-sulphone, 1-amino-benzene-2-butylsulphone, or a substitution product of any of these, which does not contain substituents occupying the para-position to the amino-group.

There may also be used amino-sulphones which contain the sulphone-group in para-position to the amino-group and, at least in one ortho-position, contain no substituent; for example, 4-amino-1,1'diphenyl - sulphone, 4-amino-4'-methyl-1,1'-diphenyl-sulphone, 4-amino-4'-chloro-1,1'-diphenyl-sulphone, 1 - aminobenzene-4-alkyl- and -aralkyl-sulphones, for instance 1-aminobenzene-4-methyl-sulphone, 1-aminobenzene - 4 - ethyl-sulphone, 1-aminobenzene-4-benzylsulphone.

The acid sulphates may be made by the known method of mixing the bases with the equivalent quantity of sulphuric acid. The salt may be formed in aqueous solution or in other medium. The acid sulphate is converted into the sulphonic acid in the usual manner by heating it in presence or absence of an organic solvent, advantageously under diminished pressure. The temperature at which the conversion occurs depends on the constitution and the presence of further substituents.

The sulphonic acids which are the products of the invention are colorless to grey powders, soluble in water, especially in the form of their alkali salts. They are valuable intermediate products and serve excellently for making dyestuffs by coupling their diazo-compounds with desired coupling components.

Numerous experiments have shown that these sulphone-sulphonic acids cannot be obtained by other processes, for example by treating the amines with sulphonating agents, such as sulphuric acid, sulphuric acid containing $SO_3$, or chlorosulfonic acid, at least not in the pure form in which they are obtained according to my new baking process, nor are they obtainable by other methods, for example by sulphonating and reducing the corresponding nitro-sulphones.

The following examples illustrate the invention, the parts being by weight:—

Example 1

A solution of 171 parts of 1-amino-benzene-2-methyl-sulphone in 100 parts of concentrated sulphuric acid and a little water is heated in a vacuum for 10 hours at 180–200° C. The brittle residue thus obtained is dissolved in about 500 parts of water and the solution filtered from traces of impurities. By acidifying the filtrate or salting out there is obtained in a good yield the sulphonic acid of 1-amino-benzene-2-methyl-sulphone of the formula

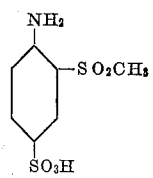

Production of the sulphonic acid of 1-amino-benzene-2-ethyl-sulphone is similar.

*Example 2*

Into a solution of 171 parts of 1-aminobenzene-4-methyl-sulphone in 450 parts of acetic acid of about 85 per cent. strength there is run, while stirring, 100 parts of concentrated sulphuric acid. The acetic acid is distilled and the residue heated in a vacuum for 8 hours at 180–200° C. The product is dissolved in hot water and the solution filtered from a small quantity of impurities. By cooling or acidifying the filtrate there is obtained in a good yield the sulphonic acid of 1-amino-benzene-4-methyl-sulphone of the formula

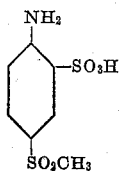

*Example 3*

247 parts of 2-amino-4'-methyl-1,1'-diphenyl-sulphone are dissolved in 500 parts of acetic acid of about 85 per cent. strength and converted into the acid sulphate by addition of 100 parts of concentrated sulphuric acid. After the acetic acid has been expelled the whole is heated in a vacuum for 8 hours at 180–200° C. The residue is dissolved in caustic soda solution and the solution is filtered from traces of impurities. By acidifying the filtrate the sulphonic acid of 2-amino-4'-methyl-1,1'-diphenylsulphone of the formula

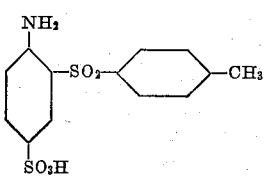

is precipitated.

*Example 4*

247 parts of 1-aminobenzene-4-benzylsulphone are dissolved in 3200 parts of acetic acid of about 85 per cent. strength and converted into the acid sulphate by addition of 100 parts of concentrated sulphuric acid. After expelling the acetic acid the whole is heated for 8 hours in a vacuum at 180 to 200° C. The product is worked up by the prescription of the previous example, whereby the sulphonic acid of 1-amino-4-benzyl-sulphone of the formula

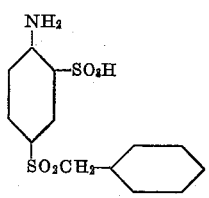

is obtained.

Instead of acetic acid there may be used chlorobenzene, nitrobenzene, pyridine or the like. In place of sulphuric acid chlorosulphonic acid may for example be used. The conversion into the sulphonic acid may also be carried out in the presence of a solvent which, according to its volatility, is distilled off during or after the conversion. According to these possibilities the conversion temperature may be varied within certain limits.

What I claim is:—

1. As a new process, the baking of the sulphuric acid addition salt of amino-arylsulphones of the general formua

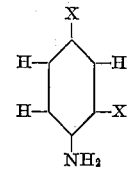

in which one X stands for hydrogen and the other X stands for a sulphone radical SO₂—R, R standing for a member of the group consisting of a lower alkyl, benzyl and aryl of the benzene series.

2. As a new process, the baking of the sulphuric acid addition salt of an amino-arylsulphone of the formula

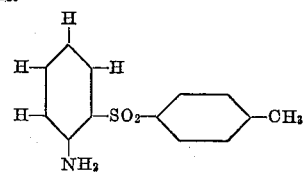

3. As a new process, the baking of the sulphuric acid addition salt of an amino-arylsulphone of the formula

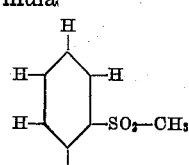

4. As new products, the amino-arylsulphone-sulphonic acids of the general formula

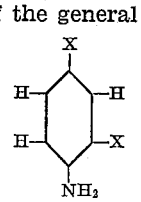

in which one X stands for a SO₃H-group and the other X stands for a sulphone radical SO₂—R, R standing for a member of the group consisting of a lower alkyl, benzyl and aryl of the benzene series, which products are light colored powders dissolving easily in water on addition of alkalies and which are converted into diazo-compounds by the use of nitrites and acids.

5. As a new product, the amino-arylsulphone-sulphonic acid of the formula

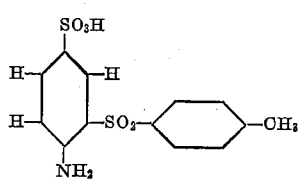

which product is a light colored powder dissolving easily in water on addition of alkalies and which is converted into diazo-compounds by the use of nitrites and acids.

6. As a new product, the amino-arylsulphone-sulphonic acid of the formula

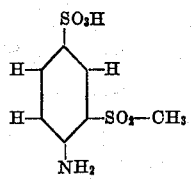

which product is a light colored powder dissolving easily in water on addition of alkalies and which is converted into diazo-compounds by the use of nitrites and acids.

7. As a new product, the amino-arylsulphone-sulphonic acid of the formula

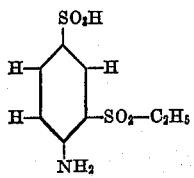

which product is a light colored powder dissolving easily in water on addition of alkalies and which is converted into diazo-compounds by the use of nitrites and acids.

JAKOB SCHEIDEGGER.